(12) United States Patent
Centemeri

(10) Patent No.: US 7,853,705 B2
(45) Date of Patent: Dec. 14, 2010

(54) ON DEMAND SESSION PROVISIONING OF IP FLOWS

(75) Inventor: Marco Cesare Centemeri, Via Zara (IT)

(73) Assignee: Cisco Technology, Inc., San Jose, CA (US)

( * ) Notice: Subject to any disclaimer, the term of this patent is extended or adjusted under 35 U.S.C. 154(b) by 1266 days.

(21) Appl. No.: 10/703,640

(22) Filed: Nov. 6, 2003

(65) Prior Publication Data
US 2005/0108423 A1   May 19, 2005

(51) Int. Cl.
*G06F 15/16* (2006.01)
(52) U.S. Cl. .................. 709/229; 709/224; 709/227; 709/228
(58) Field of Classification Search ............. 370/401, 370/352, 338, 392; 726/12, 3, 4, 5, 14; 709/229, 709/227, 203, 224, 228; 713/153, 164, 182, 713/168; 455/432.1, 403, 466; 380/270; 340/5.61
See application file for complete search history.

(56) References Cited

U.S. PATENT DOCUMENTS

| | | | | |
|---|---|---|---|---|
| 5,241,594 | A | 8/1993 | Kung | 380/4 |
| 5,440,635 | A | 8/1995 | Bellovin et al. | 380/25 |
| 5,655,077 | A | 8/1997 | Jones et al. | 395/187.01 |
| 5,671,354 | A | 9/1997 | Ito et al. | 395/187.01 |
| 5,835,727 | A | 11/1998 | Wong et al. | 395/200.68 |
| 6,018,767 | A | 1/2000 | Fijolek et al. | 709/218 |
| 6,189,102 | B1 | 2/2001 | Beser | 713/201 |
| 6,311,275 | B1 | 10/2001 | Jin et al. | 713/201 |
| 6,351,773 | B1 | 2/2002 | Fijolek et al. | 709/228 |
| 6,643,782 | B1 | 11/2003 | Jin et al. | 713/201 |
| 2003/0084165 | A1* | 5/2003 | Kjellberg et al. | 709/227 |
| 2003/0182285 | A1* | 9/2003 | Kuwata et al. | 707/8 |
| 2004/0019687 | A1* | 1/2004 | Ozawa et al. | 709/229 |
| 2004/0044772 | A1* | 3/2004 | Harkin | 709/227 |
| 2004/0185777 | A1* | 9/2004 | Bryson | 455/41.1 |
| 2004/0198386 | A1* | 10/2004 | Dupray | 455/456.1 |
| 2004/0205176 | A1* | 10/2004 | Ting et al. | 709/223 |
| 2006/0053290 | A1 | 3/2006 | Randle et al. | 713/169 |

* cited by examiner

*Primary Examiner*—Ario Etienne
*Assistant Examiner*—Barbara N Burgess
(74) *Attorney, Agent, or Firm*—Baker Botts L.L.P.

(57) ABSTRACT

A method for on demand session provisioning includes receiving a first packet from a user at a service selection gateway. The service selection gateway provides the user with access to one or more services. The first packet is associated with a selected one of the services. An access request is sent to an authorization server. A temporary user session is created to allow the user to temporarily access the selected service pending authorization. Subsequently received packets are forwarded while the temporary user session is valid. An authorization response is received from the authorization server. If the authorization response indicates that the user is authorized to access the selected service, a permanent user session is created to allow the user to access the selected service. Otherwise, the temporary user session is terminated.

24 Claims, 2 Drawing Sheets

ON DEMAND SESSION PROVISIONING OF IP FLOWS

TECHNICAL FIELD OF THE INVENTION

This invention relates in general to network systems and, more particularly, to on demand session provisioning of IP flows.

BACKGROUND OF THE INVENTION

Network systems have become increasingly sophisticated to support enhanced access to various services provided by a networks. Access to networks and services is provided by access gateways. Typically, the access gateways require authentication and authorization of the user before permitting communications between the user and the networks or services. Authentication enables the access gateway to identify a particular user and may include login and password dialog or other security protocols. Authorization enables the access gateway to identify services to which the particular user may access.

SUMMARY OF THE INVENTION

In accordance with the present invention, techniques for configuring remote gateways are provided.

According to one example of the present invention, a method for on demand session provisioning includes receiving a first packet from a user at a service selection gateway. The service selection gateway provides the user with access to one or more services. The first packet is associated with a selected one of the services. An access request is sent to an authorization server. A temporary user session is created to allow the user to temporarily access the selected service pending authorization. Subsequently received packets are forwarded while the temporary user session is valid. An authorization response is received from the authorization server. If the authorization response indicates that the user is authorized to access the selected service, a permanent user session is created to allow the user to access the selected service. Otherwise, the temporary user session is terminated.

Certain embodiments of the invention may provide one or more technical advantages. These techniques permit authorization functionality to reside within the service selection gateway. For example, the service selection gateway may seek authorization before a user is given access to a particular requested network service. This centralizes management of who may access network services in the service selection gateway. A technical advantage may be that the need for the service selection gateway to act as a radius proxy to the access gateway is alleviated. Certain embodiments include volatile memory, such that the service selection gateway may temporarily store user profiles that indicate the particular services to which a user is authorized to access. Thus, the service selection gateway need not store the thousands or millions of user profiles in the quick response memory.

Other technical advantages will be readily apparent to one skilled in the art from the following figures, descriptions and claims. Moreover, while specific advantages have been described above, various embodiments may include none, some, or all of the enumerated technical advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
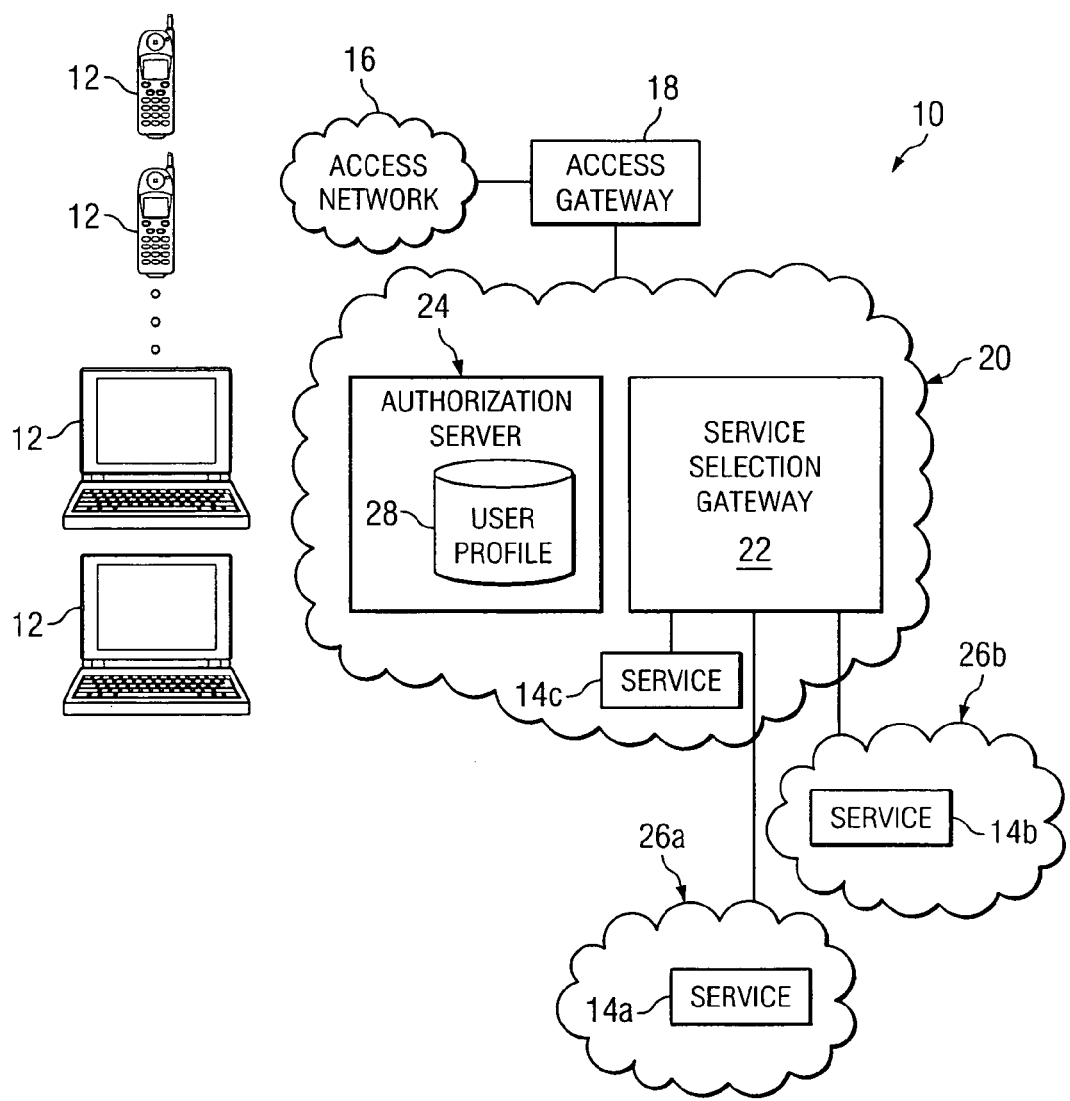
FIG. 1 illustrates a system for on demand session provisioning that includes a service selection gateway linking a user to one or more network services according to particular embodiments of the present invention.

FIG. 1 illustrates a system 10 that supports packet communication services for users 12 and provides users 12 access to one or more network services 14. In the illustrated embodiment, system 10 includes an access network 16, an access gateway 18, and a network 20. Access gateway 18 links with access network 16 and network 20. Network 20 includes a service selection gateway 22 that operates to manage access to the one or more network services 14 offered by or linked to network 20. During operation, access gateway 18 receives packets from users 12 requesting one or more services 14 and forwards the packets to network 20. Service selection gateway 22 within network 20 creates a temporary user session to allow user 12 to temporarily access or deny the requested service 14 while authorization is obtained. A permanent user session may be created when and if authorization is received. Accordingly, service selection gateway 22 may selectively route IP packets to service providers within network 20 or other destination networks 26 on a per subscriber basis. Where authorization is not received, the temporary user session may be terminated and subsequently received packets dropped.

Users 12 may be any type of device suitable for communicating with access network 16 and for providing support for voice and/or data services. The voice and/or data services may include any packet-based communications. Users 12 may comprise, for example, cellular telephones, personal computers, personal digital assistants, mobile handsets, or any other devices suitable for wireless and/or wireline communications. Users 12 may gain access to services provided by network 20 or other networks linked to network 20 by communicating requests to access network 16. Thus, users 12 may communicate with access network 16 over wireless telephone networks, wireline telephone networks, or any other communication network appropriate for the particular user device. In particular embodiments, users 12 may send IP packets that identify the user 12 to access gateway 18. The IP or other packets may also request a particular service 14 offered by network 20 or another destination network 26 linked to network 20.

Access network 16 provides services for voice and data access to users 12 communicating with access network 16. According to particular embodiments, access network 16 may support wireless communications using elements such as towers and other supporting equipment to facilitate communication between users 12 and network 20. The requests for access to services 14, as generated by users 12, may be transmitted to access gateway 18 and network 20 via access network 16. Access gateway 18 links access network 16 with network 20 and other destination networks 26, such as the Internet, to provide voice and/or data services to user 12.

According to particular embodiments, access gateway 18 receives packets generated by users 12 and determines the identity of the user 12 from the packets. Access gateway 18 may also perform security functions, such as authentication, to ensure that data transmitted through access gateway 18 is secure. The specific steps or elements necessary for authentication may depend on what access network 16 and access gateway 18 require. For example authentication may include login and password dialog, challenge and response, messaging support, and, depending on the security protocol utilized, encryption. In particular embodiments, authentication may be performed locally by access gateway 18. Alternatively, access gateway 18 may communication with authorization server 24 or other devices to perform authentication.

Network 20 and destination networks 26 include any collection or arrangement of elements supporting communications and providing voice and/or data services to users 12. According to the illustrated embodiment, network 20 includes authorization server 24 and service selection gateway 22. In coordination with access gateway 18 and authorization server 24, service selection gateway 22 serves as an access point permitting users 12 to access services 14 provided by network 20 and other linked destination networks 26. Service selection gateway 22 may selectively route the packets to services 14 on a per subscriber basis. Services 14 may include intranets, the Internet, games, video on demand, or other packet based services. As illustrated, services 14 may be offered by network 20 or by other destination networks 26 linked to network 20. For example, service 14*a* may include intranet services provided by a network 26*a*, and service 14*b* may include games 14*b* provided by a network 26*b*. By contrast, service 14*c* may include Internet services provided directly by network 20. Accordingly, service selection gateway 22 may provide access to any number of services 14 offered by any number of linked networks.

Authorization server 24 may include any computing device or data storage system that contains the programs and files for performing authorization of users 12. Authorization server 24 may communicate with service selection gateway 22 to receive access requests identifying user 12 and requesting authorization to allow user 12 to access a requested service 14. In particular embodiments, authorization server 24 may use the information in the access request to allow authorization for each requested service 14. Authorization may succeed where authorization server 24 assembles or locates a set of attributes that describe what user 12 is authorized to access. For example, authorization server 24 may locate a user profile associated with a particular user 12 from a database 28. The user profile may list services 14 to which the user 12 is a subscriber. Authorization server 24 may use the user profile to determine whether the user has authority to access the requested service 14. Alternatively, authorization server 24 may send the user profile to service selection gateway 22 such that service selection gateway 22 may determine whether to allow user 12 to access the requested service 14. Accordingly, service selection gateway 22 and authorization server 24 act cooperatively to permit users 12 to access services 14 provided by network 20 and other linked destination networks 26.

In operation, a user will typically authenticate with access gateway 18. Upon authentication, any subsequently transmitted packets are sent directly from user 12 to service selection gateway 22. Service selection gateway 22 may receive IP packets over public network, private network, a fixed link, or other communications link. Upon receiving the packets from user 12, service selection gateway 22 may determine whether user 12 is authorized to access a service implicated by those packets. To determine authorization, service selection gateway 22 may send an access request to authorization server 24 or another device in network 20. The access request may request authorization to allow user 12 to access the particular service or services 14 requested by user 12. Information in the access request may be based on the packets received from user 12 and forwarded by access gateway 18. In particular embodiments, the access request may include an IP address of user 12 in dotted notation. Authorization server 24 may use the information in the access request to identify a user profile or other set of attributes associated with user 12 from database 28. For example, where the access request includes the IP address of user 12, authorization server 24 may use the IP address to retrieve the user profile or attributes from database 28. Authorization server 24 may forward the user profile or attributes to service selection gateway 22, which may then use the user profile or attributes to determine whether user 12 is authorized to access the particular service 14 that user 12 has requested. As will be described in greater detail with regard to FIG. 3, the determination as to whether user 12 has authorization to access requested services 14 determines the handling of any packets subsequently received at service selection gateway 22.

Figure 2:
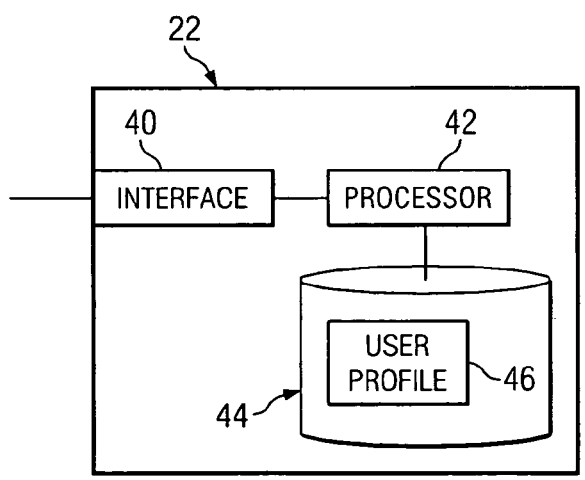
FIG. 2 illustrates a particular embodiment of a service selection gateway from the system.

FIG. 2 illustrates a particular embodiment of a service selection gateway 22 from system 10. In the embodiment illustrated, service selection gateway 22 includes one or more interfaces 40, a processor 42, and a memory 44. During operation, service selection gateway 22 works with access gateway 18 and authorization server 24 to support access of users 12 to elements within network 20.

Service selection gateway 22 includes at least one interface 40 for communicating with other elements of system 10. As illustrated, interface 40 links service selection gateway 22 with authorization server 24 and other elements in or linked to network 20. For example, service selection gateway 22 may communicate access requests to authorization server 24 via a fixed communication link through interface 40. In response, service selection gateway 22 may receive user profiles and/or user attributes from authorization server 24 through interface 40. Other elements may also be linked to service selection gateway 22 through interface 40. These elements may include access gateway 18 and one or more services 14. For example, interface 40 may receive packets from access gateway, as generated by users 12 and forwarded by access network 16. As another example, interface 40 may be used to communicate packets to services 14 offered by network 20 and any linked destination networks 26. Although service selection gateway 22 is illustrated as including a single interface 40 that communicates with multiple elements, service selection gateway 22 may include multiple interfaces 40 and each interface 40 may communicate with specific elements of system 10.

Processor 42 controls the management and operation of service selection gateway 22 by using interface 40 to communicate with other elements inside and outside of operator network 18 and by accessing and storing information in memory 44. In particular embodiments, processor 42 processes packets received from access gateway 18. Processor 42 may identify a particular user 12 from information in the packets received from access gateway 18. For example, processor 42 may identify user 12 from an IP address, device identifier, user name, sources address, or other identifying information included in the packets. Processor 42 may also generate access requests using the information in the packets received from access gateway 18 and transmit the access requests to authorization server 28. In particular embodiments, processor 42 may also create a temporary user session or other host object to allow user 12 to temporarily access the requested service 14. Using the temporary user session, processor 42 may forward any packets subsequently received from user 12 to the requested service 14 even though service selection gateway 22 has not received authorization identifying the user as authorized to access the requested service 14.

Additionally, processor 42 may determine whether service selection gateway 22 has received authorization from authorization server 28. As discussed above, authorization may indicate that user 12 is authorized to access a requested service 14. This authorization may be, as previously discussed, in any form such as a user profile specifying all services to which user 12 has authorization to access. If authorization is received, processor 42 may create a permanent user session or other host object for user 12 and terminate the temporary user session. Alternatively, processor 42 may convert the temporary user session into a permanent user session. If authorization is not received or if user 12 is not authorized, processor 42 may terminate the temporary user session. For example, processor 42 may terminate the temporary user session by dropping any subsequently received packets or by otherwise ceasing to forward the packets. In particular embodiments, processor 42 may terminate the temporary user session if the user session has timed out. A user session may time out if a specified amount of time passes without receiving authorization from authorization server 24. For example, the temporary user session may time out if user 12 has not been authorized after 500 to 2000 milliseconds. This value is defined to be configurable on service selection gateway 22.

According to particular embodiments, processor 42 may determine whether a user session has become inactive. A user session may become inactive when service selection gateway 22 does not received packets or other traffic from user 12 for a specified amount of time. In particular embodiments, the user session may become inactive if service selection gateway 22 does not receive packets from user 12 as required by a configurable timer after 10 to 20 seconds. Thus, processor 42 may determine how long it has been since service selection gateway 22 received packets from user 12 and terminate the user session if the user session has become inactive. If data traffic is received from user 12 after a user session has become inactive, processor 42 may generate a new access request to be transmitted to authorization server 24 for authorization to allow user 12 access to the requested server 14. Processor 42 may further operate to establish a second temporary user session while processor 42 waits for authorization. By determining whether a user session has become inactive, service selection gateway 22 may more quickly react to communications received for active sessions. Additionally, service selection gateway 22 need not keep track of user profiles associated with inactive sessions.

Memory 44 includes information for use during the operation of service selection gateway 22, such as for processing packets received from access gateway 18 and generating access requests to be transmitted to authorization server 24. In the illustrated embodiment, memory 104 also stores user profiles 46. Accordingly, memory 44 may include logic that enables processor 42 to perform functions such as determining an IP address associated with user 12 from the received packets. Memory 44 may also include logic that enables processor 42 to generate an access request from the information included in the packets received from access gateway 18. As illustrated, memory 44 may also include user profiles 46 or other data associated with user 12. These user profiles 46 may include, for example, information and attributes that identify services 14 to which user 12 is a subscriber. User profiles 46 may also billing data, bandwidth specifications, and other information associated with user 12 that may be used for regulating access to services 14. In particular embodiments, user profiles 46 may comprise authorization received from authorization server 24. The authorization may identify particular services 14 that the user 12 is authorized to access.

In operation, service selection gateway 22 responds to packets received from access gateway 18 via interface 40. Using information in the packets, processor 42 generates an access request that identifies user 12 and requests authorization to allow user 12 to access one or more requested services 14. Service selection gateway 22 transmits the access request to authorization server 24 via interface 40 or another interface of service selection gateway 22. In particular embodiments, processor 22 may initiate a temporary user session or other host object that enables user 12 to access the requested service 14 while service selection gateway 22 waits for authorization from authorization server 24. Subsequently received packets may be forwarded to the appropriate service 14 until a response is received or until the temporary user session times out.

Upon receiving a response from authorization server 24, processor 42 may store user profile 46 or other information and attributes associated with user 12 in memory 44. Because information in user profile 46 may indicate the particular services 14 that user 12 is authorized to access, processor 42 may then determine whether user 12 is authorized to access the particular service 14 requested by user 12. Where user 12 is authorized to access the requested service 14, processor 42 may initiate a permanent user session for user 12. Subsequently received packets and other communications from user 12 may then be routed to the requested service 14 as is appropriate. Moreover, service selection gateway 22 may provide user 12 access to requested services 14 based upon parameters established by the user profile received from authorization server 24. The user profile 46 associated with user 12 may be stored in memory 44 until user 12 terminates the user session or until the user session otherwise becomes inactive.

While the embodiment illustrated and the preceding description focus on a particular embodiment of service selection gateway 22 that includes specific elements, system 10 contemplates service selection gateway 22 having any suitable combination and arrangement of elements for handling user requests to services 14. Therefore, the modules and functionalities described may be combined, separated, or otherwise distributed among any suitable functional components, and some or all of the functionalities of service selection gateway 22 may be implemented by logic encoded in media, such as software and programmed logic devices.

Figure 3:
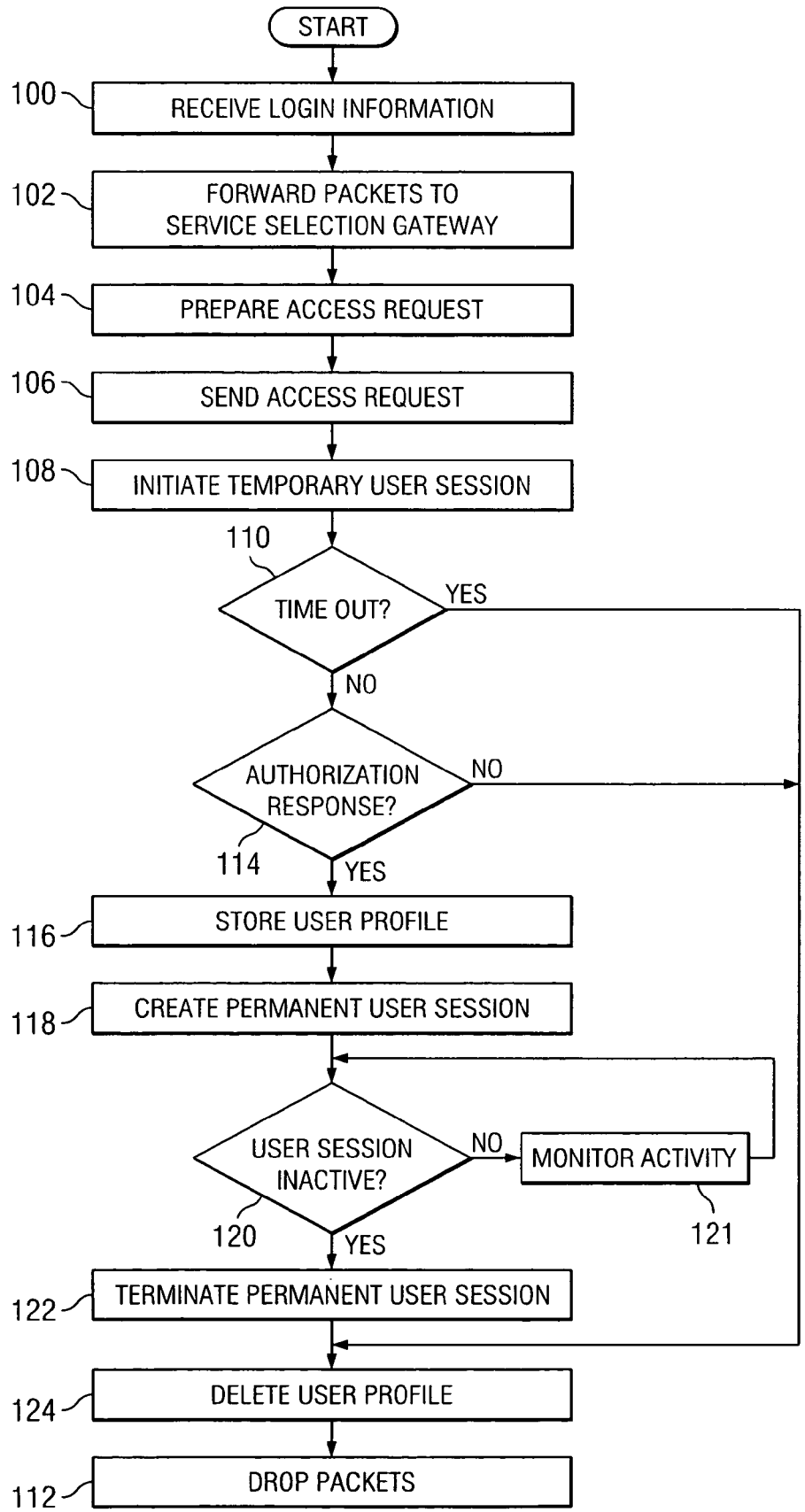
FIG. 3 illustrates a method for on demand session provisioning at a service selection gateway.

FIG. 3 illustrates an example method for on demand session provisioning at a service selection gateway 22. The method begins at step 100 where access gateway 18 receives login information or other information identifying user 12 to system 10. Access gateway 18 may perform authentication locally or communicate the login or other information to other devices in system 10 to authenticate user 12 to system 10. At this point, access gateway 18 has verified an identify for user 12, but authorization for various services 14 has not been established.

At step 102, access gateway 18 forwards the packets to service selection gateway 22. The packets may be transmitted over a fixed line or other communications link between access gateway 18 and network 20. The packets may include an address or other information identifying or associated with user 12. In response to receiving packets from user 12, service selection gateway 22 generates an access request at step 104. The access request identifies user 12 and requests authorization to allow user 12 to access one or more requested services 14. The access request may be generated using information in the packets received from access gateway 18. In particular embodiments, the access request may include an address associated with user 12.

At step 106, Service selection gateway 22 sends the access request to authorization server 24. The access request may be transmitted to authorization server 24 via interface 40 or another interface of service selection gateway 22. To permit user 12 immediate access to the requested service 14 while authorization takes place, a temporary user session may be initiated at step 108. The temporary user session may be used by service selection gateway 22 while service selection gateway 22 waits for authorization from authorization server 22. Accordingly, processor 42 of service selection gateway 22 may forward any packets subsequently received from user 12 to the appropriate service 14 while service selection gateway 22 awaits authorization from authorization server 24. In particular embodiments, authorization server 24 may use a source address or other information in the received packets to identify a user profile or other information or attributes associated with the user in memory 28. The user profile or other information or attributes may then be forwarded to service selection gateway 22. The user profile or other information or attributes may identify various services 14 that user 12 is authorized to access. For example, the user profile for a particular user 12 may indicate that the particular user 12 is authorized to access a game through service 14b offered by destination network 26a and the Internet through service 14c offered by network 20.

At decision step 110, service selection gateway 22 determines whether the temporary user session has timed out. As described above, a user session may time out when service selection gateway 22 has not received authorization within a specified amount of time. If service selection gateway 22 determines that the temporary user session has timed out, service selection gateway 22 may drop any packets subsequently received from user 12 at step 112. Alternatively, if service selection gateway 22 determines that the temporary user session has not timed out at step 110, the method continues to step 114.

At decision step 114, service selection gateway 22 determines whether user 12 has authorization to access the requested service 14. The determination may be based on the user profile received from authorization server 24. For example, assume that user 12 has requested access to an intranet through service 14a. Where the user profile associated with user 12 as received from authorization server 24 indicates that user 12 is authorized to access games through service 14b and the Internet through service 14c but does not indicate that user 12 is authorized to access the particular intranet through service 14a, processor 42 may determine that authorization has failed. Thus, service selection gateway 22 may determine that authorization has failed anytime user 12 requests access to a service 14 to which user 12 is not authorized. Where authorization fails, service selection gateway 22 may drop any packets subsequently received from user 12 at step 112.

Alternatively, service selection gateway 22 may determine at step 114 that user 12 has authorization to access the requested service 14. For example, where user 12 requests access to an intranet through service 14a and the user profile associated with user 12 indicates that user 12 is authorized to access service 14a, service selection gateway 22 may determine that user 12 has authorization. Thus, service selection gateway 22 may determine that user 12 has authorization anytime user 12 requests access to a service 14 to which user 12 is not authorized. When service selection gateway 22 determines that user 12 has authorization to access the requested service 14, the user profile or other information or attributes received from authorization server 24 is stored at step 116. The user profile or other attributes may be stored as a user profile 46 in memory 44. Processor 42 may then access user profile 46 in memory 44 as needed for the direction of traffic received from user 12. Future packets received may allow user 12 to access the same service 14 for which a user session was initially created or other services 14 also authorized by the user profile.

At step 118, a permanent user session is created. Service selection gateway 22 may initiate the permanent user session, or service selection gateway 22 may convert the temporary user session into a permanent user session. Any packets subsequently received from user 12 may be forwarded to the requested service 14 based upon the permanent user session. For example, where user 12 requests a game through service 14b offered by destination network 26b, any packets received from user 12 as user 12 plays the game may be forwarded to service 14b in destination network 26a. In particular embodiments, service selection gateway 22 may be operable to handle service selection changes. For example, user 12 may begin by requesting a game through service 14b, but at some point desire to search for something on an intranet through service 14a. As new packets are received from user 12, service selection gateway 22 may determine whether user 12 is authorized to access the intranet through service 14a using user profile 46 stored in memory 44. If user profile 46 indicates that user 12 is authorized to access the Internet through service 14c, the packets initially requesting the Internet through service 14c and any subsequently received packets may be forwarded to service 14c. In this manner, service selection gateway 22 may selectively route IP packets to access services 14 for a user 12 where that user 12 has a permanent user session initiated through service selection gateway 22.

According to particular embodiments, service selection gateway 22 may determine at decision step 120 whether a user session has become inactive. As described above, a user session may become inactive if service selection gateway 22 does not receive packets or other traffic from user 12 for a specified amount of time. For example, the user session may become inactive if service selection gateway 22 does not receive any packets from user 12 for more than three to four seconds. If service selection gateway 22 determines that the user session has not become inactive, service selection gateway 22 may continue to monitor packet activity at step 121 until the user session is determined to be inactive at step 120. When service selection gateway 22 determines that the user session has become inactive, service selection gateway 22 terminates the permanent user session at step 122. User profile 46 associated with user 12 may be deleted from memory 44 at step 124. Upon deletion of user profile 46 from memory 44, any subsequently received packets may be dropped at step 112.

Thus, the flowchart and preceding description outline the configuration of network 20 and service selection gateway 22 to dynamically handle access to services requests. However, the flowchart and accompanying description illustrate only an exemplary method of operation, and system 10 contemplates the configuration of network 20 and service selection gateway 22 using any suitable techniques and elements for processing packets accessing services 14 offered by network 20 or other destination network 26. Therefore, many of the steps in this flowchart may take place simultaneously and/or in different orders than as shown. In addition, the configuration of network 20 and service selection gateway 22 may use methods with additional steps, fewer steps, and/or different steps, so long as the methods remain appropriate.

Although the present invention has been described with several examples, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for on demand session provisioning comprising:
   receiving, at a service selection gateway, a first packet from an access gateway, the access gateway having authenticated an identity of a user, the service selection gateway operable to provide the user with access to one or more services, the first packet associated with a selected one of the services;
   sending an access request to an authorization server from the service selection gateway, the access request identifying the user and requesting authorization to allow the user to access the selected one of the services;
   creating a temporary user session operable to allow the user to temporarily access the selected one of the services pending authorization;
   forwarding subsequently received packets while the temporary user session is valid;
   creating a next temporary user session while waiting for authorization to continue forwarding subsequently received packets;
   receiving an authorization response from the authorization server, the authorization response comprising a user profile associated with the user, the user profile indicating one or more services that the user is authorized to access;
   determining whether the authorization response indicates that the user is authorized to access the selected one of the services;
   creating a permanent user session operable to allow the user to access the selected one of the services if the authorization response indicates that the user is authorized to access the selected one of the services;
   terminating the temporary user session if the authorization response indicates that the user is not authorized to access the selected one of the services;
   receiving a request for a change to a next selected service of the one or more services;
   determining that the user profile indicates that the user is authorized to access the next selected service of the one or more services; and
   creating a next permanent user session operable to allow the user to access the next selected service of the one or more services.

2. The method of claim 1, wherein the first packet comprises an Internet protocol (IP) packet.

3. The method of claim 1, further comprising, if the authorization response is not received after a predetermined period of time, terminating the temporary user session.

4. The method of claim 1, wherein the user profile includes billing data and bandwidth specifications associated with the user.

5. The method of claim 1, further comprising storing the user profile in a memory of the service selection gateway.

6. The method of claim 5, further comprising:
   determining whether the next permanent user session is inactive; and
   terminating the next permanent user session if the next permanent user session is inactive; and
   deleting the user profile from the memory of the service selection gateway.

7. The method of claim 1, further comprising deleting the user profile after the user terminates the permanent user session.

8. The method of claim 1, further comprising:
   determining whether the next permanent user session is inactive; and
   terminating the next permanent user session if the next permanent user session is inactive.

9. A service selection gateway for providing a user with access to one or more services comprising:
   a first interface of the service selection gateway, the first interface coupling to one or more components of the network and operable to:
      receive a first packet from an access gateway, the access gateway having authenticated an identity of a user, the first packet associated with a selected one of the services;
      send an access request to an authorization server, the access request identifying the user and requesting authorization to allow the user to access the selected one of the services; and
   a processor operable to:
      create a temporary user session operable to allow the user to temporarily access the selected one of the services pending authorization;
      forward subsequently received packets while the temporary user session is valid;
      create a next temporary user session while waiting for authorization to continue forwarding subsequently received packets;
      receive an authorization response from the authorization server, the authorization response comprising a user profile associated with the user, the user profile indicating one or more services that the user is authorized to access;
      determine whether the authorization response indicates that the user is authorized to access the selected one of the services;
      create a permanent user session operable to allow the user to access the selected one of the services if the authorization response indicates that the user is authorized to access the selected one of the services;
      terminate the temporary user session if the authorization response indicates that the user is not authorized to access the selected one of the services;
      receive a request for a change to a next selected service of the one or more services;
      determine that the user profile indicates that the user is authorized to access the next selected service of the one or more services; and
      create a next permanent user session operable to allow the user to access the next selected service of the one or more services.

10. The service selection gateway of claim 9, wherein the first packet comprises an Internet protocol (IP) packet.

11. The service selection gateway of claim 9, wherein the processor is further operable to terminate the temporary user session if the authorization response is not received after a predetermined period of time.

12. The service selection gateway of claim 9, wherein the user profile includes billing data and bandwidth specifications associated with the user.

13. The service selection gateway of claim 9, wherein the processor is further operable to store the user profile in a memory of the service selection gateway.

14. The service selection gateway of claim 13, wherein the processor is further operable to:
- determine whether the next permanent user session is inactive; and
- terminate the next permanent user session if the next permanent user session is inactive; and
- delete the user profile from the memory of the service selection gateway.

15. The service selection gateway of claim 9, wherein the processor is further operable to delete the user profile after the user terminates the permanent user session.

16. The service selection gateway of claim 9, wherein the processor is further operable to:
- determine whether the next permanent user session is inactive; and
- terminate the next permanent user session if the next permanent user session is inactive.

17. Logic for configuring enterprise gateways, the logic embodied in a non-transitory computer-readable medium and operable to:
- receive, at a service selection gateway, a first packet from an access gateway, the access gateway having authenticated an identity of a user, the service selection gateway operable to provide the user with access to one or more services, the first packet associated with a selected one of the services;
- send an access request to an authorization server from the service selection gateway, the access request identifying the user and requesting authorization to allow the user to access the selected one of the services;
- create a temporary user session operable to allow the user to temporarily access the selected one of the services pending authorization;
- forward subsequently received packets while the temporary user session is valid;
- receive an authorization response from the authorization server, the authorization response comprising a user profile associated with the user, the user profile indicating one or more services that the user is authorized to access;
- determine whether the authorization response indicates that the user is authorized to access the selected one of the services;
- create a permanent user session operable to allow the user to access the selected one of the services if the authorization response indicates that the user is authorized to access the selected one of the services;
- terminate the temporary user session if the authorization response indicates that the user is not authorized to access the selected one of the services;
- receive a request for a change to a next selected service of the one or more services;
- determine that the user profile indicates that the user is authorized to access the next selected service of the one or more services; and
- create a next permanent user session operable to allow the user to access the next selected service of the one or more services.

18. The logic of claim 17, wherein the first packet comprises an Internet protocol (IP) packet.

19. The logic of claim 17, further operable to terminate the temporary user session if the authorization response is not received after a predetermined period of time.

20. The logic of claim 17, wherein the user profile includes billing data and bandwidth specifications associated with the user.

21. The logic of claim 17, further operable to store the user profile in a memory of the service selection gateway.

22. The logic of claim 21, further operable to:
- determine whether the next permanent user session is inactive; and
- terminate the next permanent user session if the next permanent user session is inactive; and
- delete the user profile from the memory of the service selection gateway.

23. The logic of claim 17, further operable to delete the user profile after the user terminates the permanent user session.

24. The logic of claim 17, further operable to:
- determine whether the next permanent user session is inactive; and
- terminate the next permanent user session if the next permanent user session is inactive.

* * * * *